US008749687B2

(12) United States Patent
Kang

(10) Patent No.: US 8,749,687 B2
(45) Date of Patent: Jun. 10, 2014

(54) APPARATUS AND METHOD OF CAPTURING JUMP IMAGE

(75) Inventor: Tae-hoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 12/939,480

(22) Filed: Nov. 4, 2010

(65) Prior Publication Data

US 2011/0128397 A1 Jun. 2, 2011

(30) Foreign Application Priority Data

Nov. 30, 2009 (KR) ........................ 10-2009-0117097

(51) Int. Cl.
H04N 5/222 (2006.01)
(52) U.S. Cl.
USPC .................................................. 348/333.01
(58) Field of Classification Search
USPC .................................................... 348/222.1
See application file for complete search history.

(56) References Cited

U.S. PATENT DOCUMENTS

| 5,531,645 | A | * | 7/1996 | Collins | 472/97 |
| 5,640,612 | A | * | 6/1997 | Owashi | 396/55 |
| 6,369,908 | B1 | * | 4/2002 | Frey et al. | 358/1.15 |
| 7,123,284 | B2 | * | 10/2006 | Aoike | 348/14.02 |
| 7,535,496 | B2 | * | 5/2009 | Jelinek | 348/231.4 |
| 7,710,488 | B2 | * | 5/2010 | Wang | 348/333.05 |
| 8,059,163 | B2 | * | 11/2011 | Rimon et al. | 348/222.1 |
| 8,126,720 | B2 | * | 2/2012 | Nakagawa et al. | 704/275 |
| 2003/0189647 | A1 | * | 10/2003 | Kang | 348/207.99 |
| 2004/0081440 | A1 | * | 4/2004 | Miwa et al. | 396/2 |
| 2004/0239799 | A1 | * | 12/2004 | Suzuki et al. | 348/370 |
| 2005/0157174 | A1 | * | 7/2005 | Kitamura et al. | 348/207.99 |
| 2005/0185082 | A1 | * | 8/2005 | Lee et al. | 348/345 |
| 2005/0231631 | A1 | | 10/2005 | Miyazaki | |
| 2006/0050151 | A1 | * | 3/2006 | Fujinawa | 348/207.99 |

(Continued)

FOREIGN PATENT DOCUMENTS

| JP | 2004-336265 A | 11/2004 |
| JP | 2006-303760 A | 11/2006 |

(Continued)

OTHER PUBLICATIONS

Jessica; Freeze a Jump and Capture the Wind With Your Camera!; Jul. 15, 2010; http://www.simple-snapshot.com/2010/07/15/freeze-a-jump-and-capture-the-wind-with-your-camera/; pp. 1-7.*

Flickr; Jumping Project / Discussion; Jun. 3, 2006; http://www.flickr.com/groups/jumping/discuss/72157594154169789/; pp. 1-2.*

(Continued)

Primary Examiner — Gary C Vieaux

(74) Attorney, Agent, or Firm — Drinker Biddle & Reath LLP

(57) ABSTRACT

A method of capturing an image of a subject jumping performed by an apparatus for processing digital images with a first and a second display is disclosed. The method includes displaying a notification for the subject to jump on the second display unit; and capturing the image of the subject jumping after the displaying of the notification has indicated that the subject should jump. An apparatus for capturing an image of a subject jumping, the apparatus including a first display unit disposed on a rear of the apparatus; a second display unit disposed on a front of the apparatus; and a digital signal processor configured to display a notification for the subject to jump on the second display unit, and configured to capture the image of the subject jumping after the display of the notification to jump has ended.

19 Claims, 9 Drawing Sheets

(56) References Cited

U.S. PATENT DOCUMENTS

| | | | |
|---|---|---|---|
| 2008/0122943 A1* | 5/2008 | Itoh | 348/222.1 |
| 2008/0138055 A1* | 6/2008 | Dunko et al. | 396/89 |
| 2008/0192129 A1* | 8/2008 | Walker et al. | 348/231.2 |
| 2009/0303352 A1* | 12/2009 | Fujinawa | 348/231.99 |
| 2010/0248792 A1* | 9/2010 | Yamashita | 455/566 |
| 2011/0008036 A1* | 1/2011 | Takatsuka et al. | 396/283 |
| 2011/0096202 A1* | 4/2011 | Lee | 348/239 |

FOREIGN PATENT DOCUMENTS

| | | | |
|---|---|---|---|
| JP | 2008-256878 A | | 10/2008 |
| JP | 2009135622 A | * | 6/2009 |
| KR | 1020070058228 A | | 6/2007 |

OTHER PUBLICATIONS digitalslrphotography.50webs.com; Mastering Digital SLR Photography—Capturing Action; 2006; pp. 1-18.*

Goh, "Samsung ST550," CNET Asia, pp. 1-10, retrieved from internet website: http://asia.cnet.com/reviews/digitalcameras/0,39005881,44957945p,00.htm (Nov. 11, 2009).

Digicamguides, "Shutter speed," DigicamGuides, p. 1, retrieved from internet website: http://www.digicamguides.com/learn.shutter-speed.html (Dec. 12, 2005).

Imaging Resource, "Nikon D60 exposure," Imaging Resource, pp. 1-4, retrieved from internet website: http://www.imaging-resource.com/PRODS/ND60/ND60A5.htm (Dec. 12, 2008).

Examination Report established for EP 10192760.6 (May 3, 2012).

* cited by examiner

FIG. 1
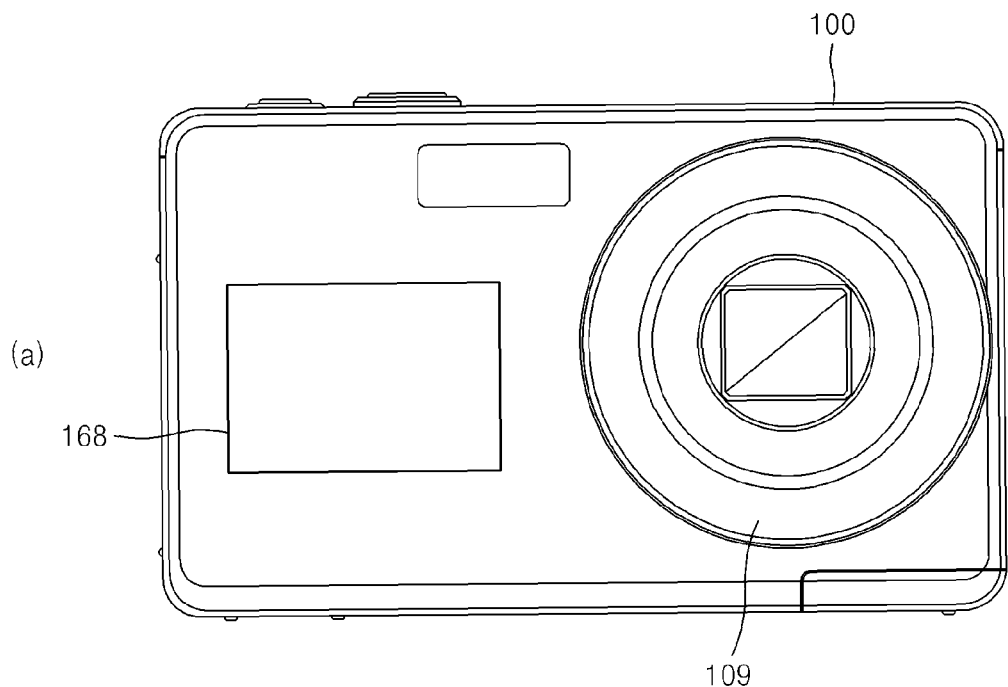
(a)
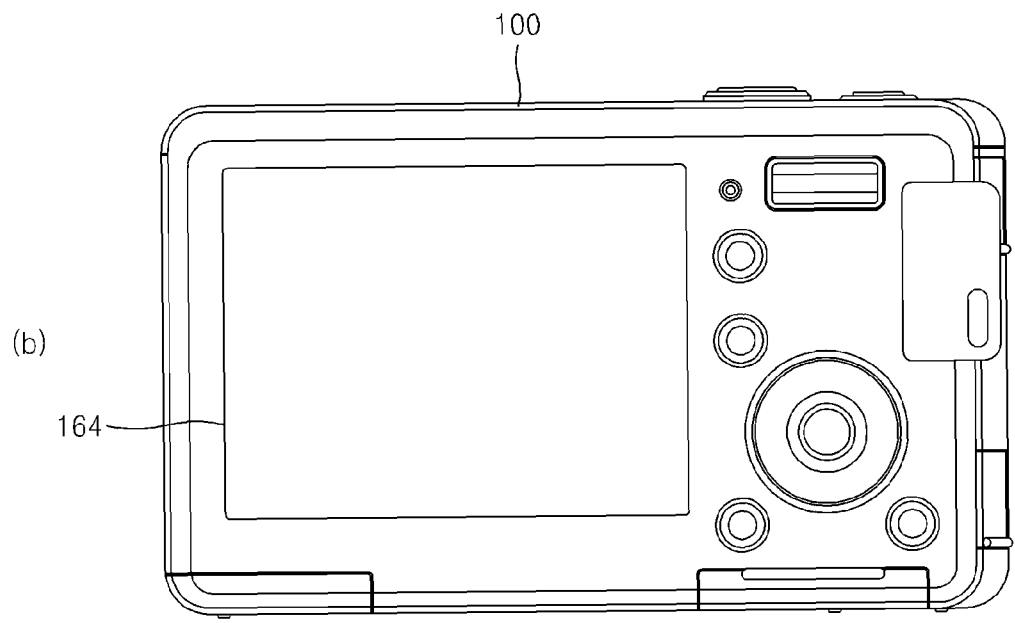
(b)

FIG. 6
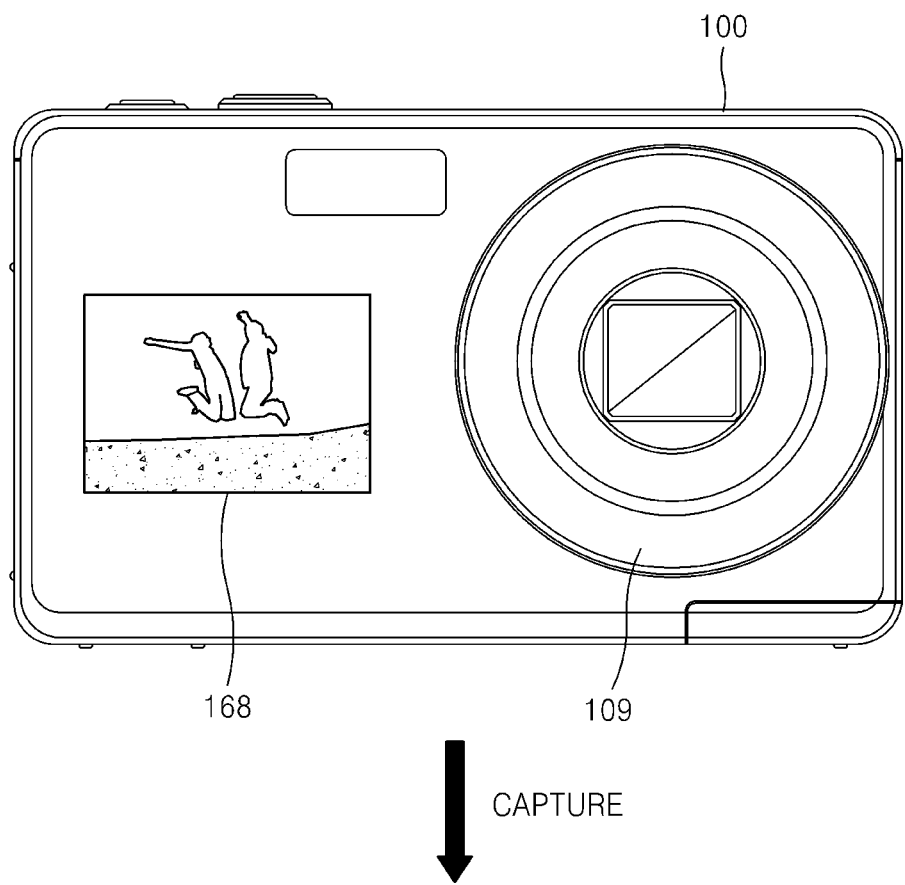
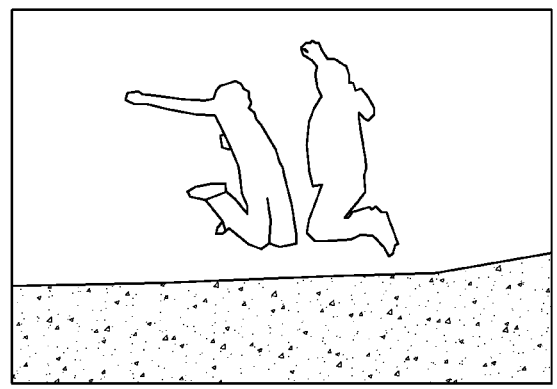

FIG. 7
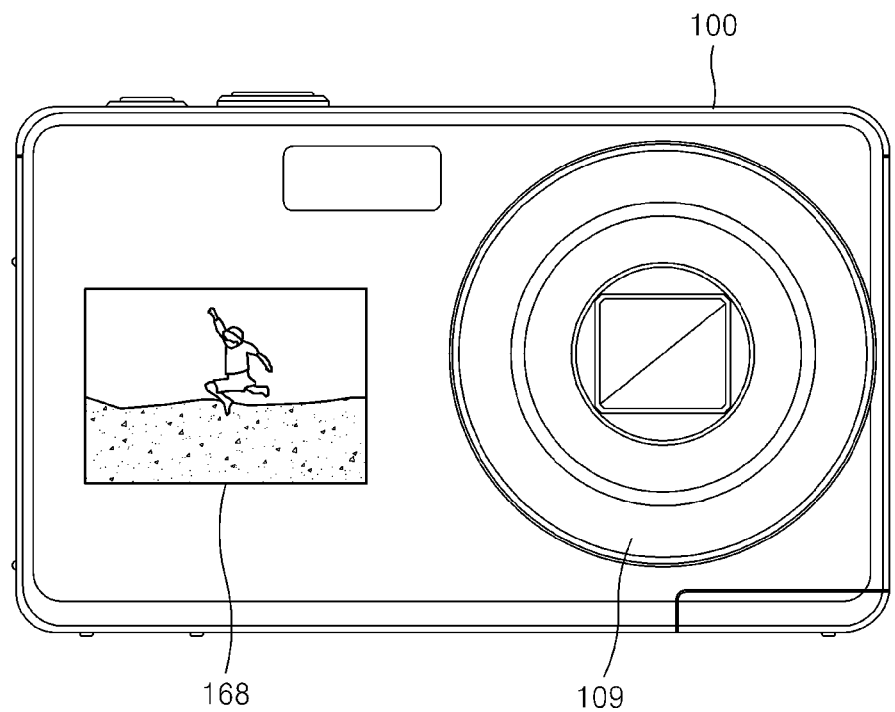
BRACKETING CAPTURE
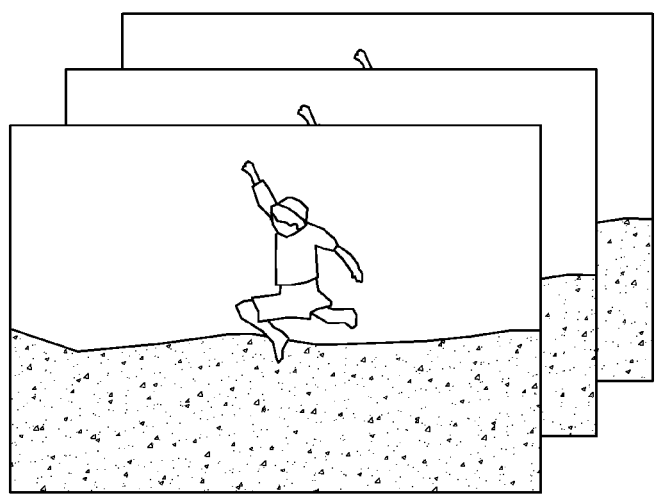

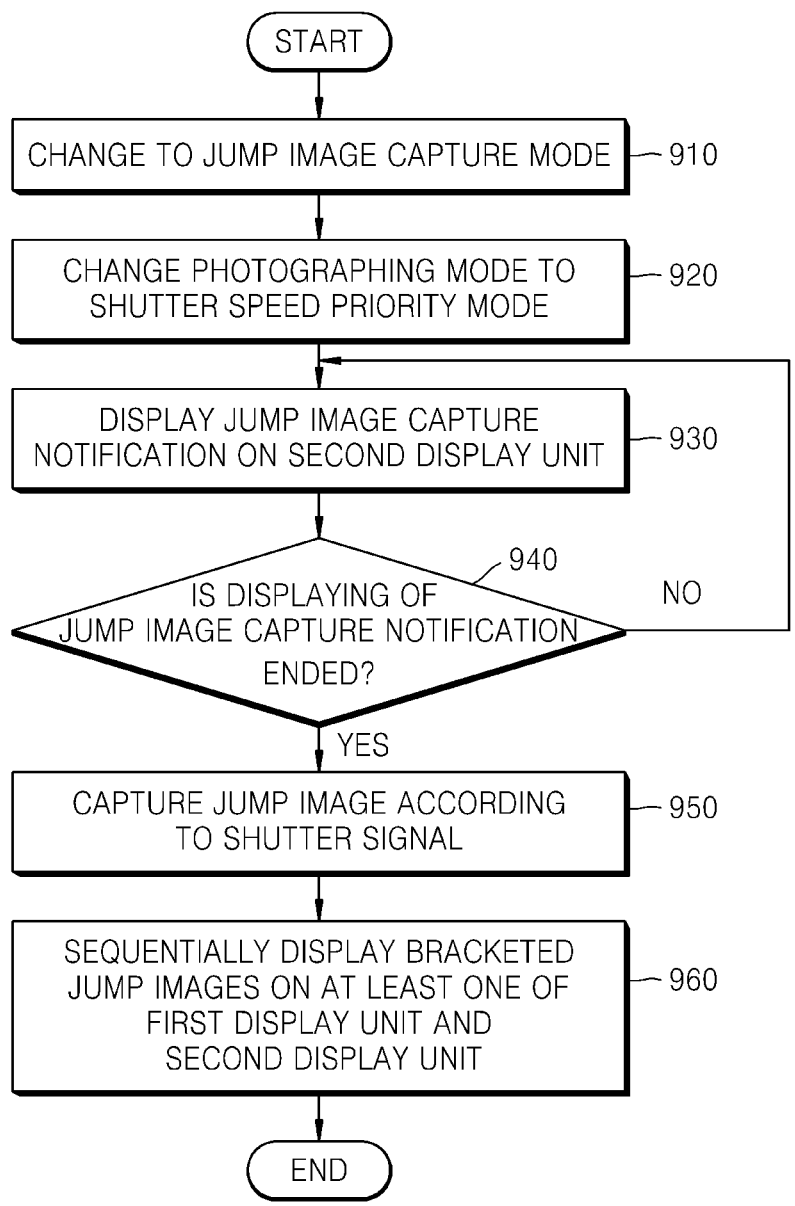

APPARATUS AND METHOD OF CAPTURING JUMP IMAGE

CROSS-REFERENCE TO RELATED PATENT APPLICATION

This application claims the benefit of Korean Patent Application No. 10-2009-0117097, filed on Nov. 30, 2009, in the Korean Intellectual Property Office, the entire disclosure of which is incorporated herein by reference.

BACKGROUND

1. Field of the Invention

Embodiments relate to an apparatus and method of processing a digital image, and more particularly, to an apparatus and method of capturing an image of a subject jumping by notifying the subject when to jump and changing a setting of the apparatus.

2. Description of the Related Art

Capturing an image of a subject jumping may be difficult because it is difficult to capture the moment when the subject reaches the peak of the jump. It may be even more difficult to capture multiple subjects jumping.

SUMMARY

Therefore, there is a need in the art for an apparatus and method for capturing an image of a subject jumping. The apparatus for capturing an image of a subject jumping including a first display unit disposed on a rear of the apparatus; a second display unit disposed on a front of the apparatus; and a digital signal processor configured to display a notification for the subject to jump on the second display unit, and configured to capture the image of the subject jumping after the display of the notification to jump has ended.

The digital signal processor may be further configured to change a photographing mode to a shutter speed priority mode prior to capturing the image of the subject jumping.

The digital signal processor may include a jump notification unit configured to provide to the second display unit the notification for the subject to jump; a change unit configured to change the apparatus to the shutter speed priority mode; and a controller configured to capture the image of the subject jumping in the shutter speed priority mode after displaying the notification for the subject to jump.

The jump notification unit may be further configured to provide to the second display unit a series of countdown images as the notification for the subject to jump, and configured to provide to the second display unit a series of countdown images with sound as the notification to the subject to jump.

The digital signal processor may be further configured to capture the image of the subject jumping after the display of the notification to jump has ended and after a period of time after the display of the notification to jump has ended, wherein the period of time is determined to permit the subject to reach a peak of the jump.

The digital signal processor may be further configured to capture the image of the subject jumping, if after the display of the notification to jump has ended, the digital signal processor receives an indication from a user of the apparatus that the subject has jumped.

The digital signal processor may be further configured to continuously capture the image of the subject jumping after displaying the notification for the subject to jump.

The digital signal processor may be further configured to bracket the image of the subject jumping after displaying of the notification for the subject to jump.

The digital signal processor may be further configured to sequentially display results of bracketing the image of the subject jumping on at least any one of the first display unit and the second display unit.

The digital signal processor may further include a bracket unit configured to bracket the image of the subject jumping in the shutter speed priority mode after displaying of the notification for the subject to jump.

A method of capturing an image of a subject jumping is provided. The method may be performed by an apparatus for processing a digital image which includes a first and a second display units. The method may include displaying a notification for the subject to jump on the second display unit; and capturing the image of the subject jumping after the displaying of the notification has ended.

Capturing the image may further include changing a photographing mode to a shutter speed priority mode.

Displaying a notification may include displaying a notification for the subject to jump on the second display unit comprising a series of countdown images.

Displaying may include displaying a notification for the subject to jump on the second display unit comprising a series of countdown images with sound.

Capturing may include if a shutter signal from a user of the apparatus indicating that the subject jumped is received after the displaying of the notification has ended, then perform the following steps: delaying a predetermined period of time determined to permit the subject to reach a peak of the jump; and capturing the image of the subject jumping.

Capturing may include continuously capturing the image of the subject jumping after the displaying of the notification has ended.

Capturing may include bracketing the image of the subject jumping after the displaying of the notification has ended.

The method may include sequentially displaying results of the bracketing on at least one of the first display unit and the second display unit.

BRIEF DESCRIPTION OF THE DRAWINGS

The above and other features and advantages of embodiments of the invention will become more apparent by describing in detail example embodiments thereof with reference to the attached drawings in which:

FIGS. 1 (*a*) and (*b*) are diagrams illustrating an exterior of an apparatus for processing a digital image, according to embodiments of the invention;

FIG. 6 is a diagram for describing the digital signal processor of FIG. 3 of capturing an image of a subject jumping;

FIG. 7 is a diagram for describing the digital signal processor of FIG. 3 of bracketing a subject jumping;

FIG. 9 is a flowchart illustrating a method of capturing an image of a subject jumping according to embodiments of the invention.

DETAILED DESCRIPTION

Hereinafter, exemplary embodiments will be described more fully with reference to the accompanying drawings.

FIGS. 1 (a) and (b) are diagrams illustrating an exterior of an apparatus 100 for processing a digital image, according to an embodiment of the invention. The apparatus 100 includes a first display unit 164 on a rear of the apparatus 100 and a second display unit 168 on a front of the apparatus 100. As shown in FIGS. 1 (a) and (b), the first display unit 164 is disposed on a side opposite of a lens barrel 109, and the second display unit 168 may be disposed on the same side as the lens barrel 109.

Figure 2:
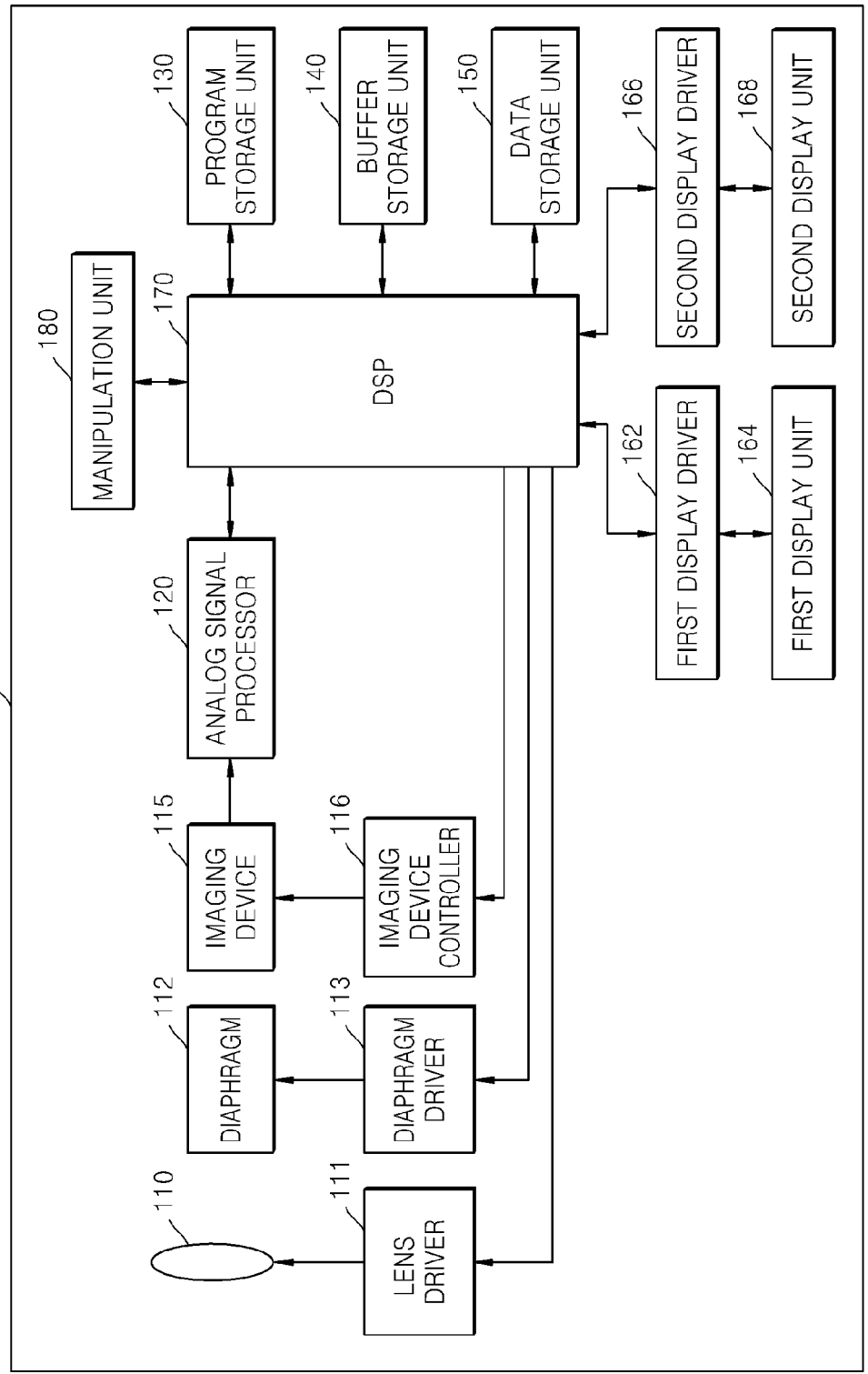
FIG. 2 is a block diagram schematically illustrating an internal structure of the apparatus of FIG. 1.

FIG. 2 is a block diagram schematically illustrating an embodiment of the internal structure of the apparatus 100 of FIG. 1.

The apparatus 100 includes a lens 110, a lens driver 111, a diaphragm 112, a diaphragm driver 113, an imaging device 115, an imaging device controller 116, an analog signal processor 120, a program storage unit 130, a buffer storage unit 140, a data storage unit 150, a first display driver 162, the first display unit 164, a second display driver 166, the second display unit 168, a digital signal processor (DSP) 170, and a manipulation unit 180.

The lens 110 concentrates incident light. Also, the lens 110 may include a zoom lens controlling a viewing angle to be narrow or wide according to a focal length and a focus lens focusing a focal point of the subject. These lenses may be formed of a respective single lens or a group of a plurality of lenses.

The diaphragm 112 adjusts an amount of incident light by adjusting a degree of openness.

The lens driver 111 and the diaphragm driver 113 respectively drive the lens 110 and the diaphragm 112 by receiving a control signal from the DSP 170. The lens driver 111 adjusts a focal length by adjusting a location of the lens 110, and performs operations such as auto-focusing, zooming, focusing, etc. The diaphragm driver 113 adjusts the degree of openness of the diaphragm 112, and specifically, adjusts an f-number to perform operations such as auto-focusing (AF), auto-exposure compensation, focusing, depth of field change, etc.

An optical signal from the optical unit 110 forms an image of the subject on a light receiving surface of the imaging device 115. A charge coupled device (CCD) or a complementary metal oxide semiconductor image sensor (CIS) for converting an optical signal to an electric signal may be used as the imaging device 115. The imaging device controller 116 may adjust sensitivity or the like of the imaging device 115. The imaging device controller 116 may control the imaging device 115 according to a control signal that is automatically generated by an image signal received in real time, or manually input by a user.

An exposure time of the imaging device 115 is adjusted by a shutter (not shown). The shutter may be a mechanical shutter for adjusting incidence of light by using a screen, or an electronic shutter for controlling the exposure by transmitting an electric signal to the imaging device 115.

The analog signal processor 120 performs a noise reduction process, a gain adjustment process, a waveform shaping process, or an analog-digital conversion process on an analog signal received from the imaging device 115.

The apparatus 100 also includes the program storage unit 130 for storing programs for an operating system, an application system, etc., the buffer storage unit 140 for temporarily storing data required for an operation or result data of the operation, and the data storage unit 150 for storing various types of information required for the programs and an image file including an image signal.

Moreover, the apparatus 100 includes the first and second display units 164 and 168 for displaying an operational state of the apparatus 100 or information about an image captured by the apparatus 100. The first and second display units 164 and 168 may provide at least one of visual information and auditory information to the user. In order to provide the visual information, the first and second display units 164 and 168 may each be a liquid crystal display (LCD) panel or an organic light emitting display panel (OLED). The first and second display drivers 162 and 166 respectively provide a driving signal to the first and second display units 164 and 168.

Also, the apparatus 100 includes the DSP 170 that processes a received image signal, and controls each element according to the received image signal or an external input signal. The DSP 170 may reduce noise in the received image signal and perform, on the image signal, an image signal process such as gamma correction, color filter array interpolation, color matrix, color correction, and color enhancement, to improve image quality. Also, the DSP 170 may generate an image file by compressing image data generated by performing the image signal process to improve image quality, or restore image data from the image file. The image data may be compressed according to reversible compression or irreversible compression. As an example of the compression format, the image data can be converted into Joint Photographing Experts Group (JPEG) format or JPEG 2000 format. The compressed image data may be stored in the data storage unit 150. Also, the DSP 170 may functionally perform a blurring process, a toning process, an edge emphasizing process, an image analyzing process, an image recognizing process, or an image effect process. A face or background may be recognized through the image recognizing process. Moreover, the DSP 170 may perform a display image signal process for displaying an image on the first and second display units 164 and 168. For example, the DSP 170 may perform a luminance level adjusting process, a color compensating process, a contrast adjusting process, a contour emphasizing process, a screen dividing process, a character image generating process, or an image composing process. The DSP 170 may be connected to an external monitor, and may perform a predetermined image signal process on the image data processed as described above to display an image on the external monitor.

The DSP 170 may execute the programs stored in the program storage unit 130, or a separate module may be included to generate a control signal for controlling auto-focusing, zooming, focusing, or auto-exposure compensation, provide the control signal to the lens driver 111, the diaphragm driver 113, or the imaging device controller 116, and control overall operations of elements of the apparatus 100.

Figure 3:
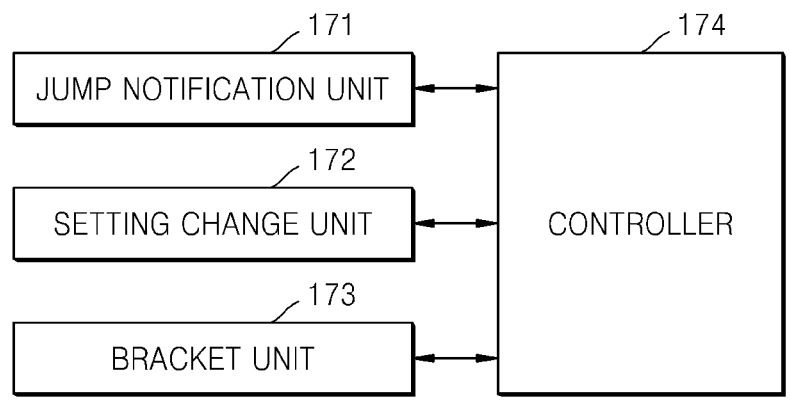
FIG. 3 is a block diagram illustrating in detail a digital signal processor of FIG. 2 for capturing a jump image.

Moreover, the DSP 170 may display a notification for the subject to jump on the second display unit 168 before capturing an image of the subject jumping, and capture or bracket the image of a subject jumping after the notification for the subject to jump has ended. The DSP 170 may wait a predetermined period of time prior to capturing the image of the subject jumping after the notification for the subject to jump so that the subject is captured in the air jumping. Accordingly, the DSP 170 may include a jump notification unit 171, a setting change unit 172, a bracket unit 173, and a controller 174 as shown in FIG. 3. Bracketing is a technique of taking several shots of the same subject using different or the same camera settings.

However, the jump notification unit 171, the setting change unit 172, the bracket unit 173, and the controller 174 may be separated as independent elements from the DSP 170, and operations thereof will be described later in detail.

The manipulation unit 180 may be used to receive a control signal from the outside, such as from the user. The manipulation unit 180 includes a shutter-release button, which receives a shutter-release signal for capturing an image by exposing the image pickup unit to light for a predetermined time, a power supply button, which is used to input a control signal for controlling on/off of the apparatus 100, a wide angle-zoom button and a telescopic-zoom button, which widens or narrows a view angle according to an input, and various function buttons for selecting a mode, such as a character input mode, a photographing mode, or a reproducing mode, for selecting a white balance setting function, and for selecting an exposure setting function. As such, the manipulation unit 180 may include various buttons, but the manipulation unit 180 may be embodied by any means enabling a user to input data, for example, a keyboard, a touch pad, a touch screen, or a remote controller.

Hereinafter, functions of the DSP 170 will now be described in detail with reference to FIGS. 1 through 7.

The DSP 170 according to embodiments of the invention may include the jump notification unit 171, the setting change unit 172, and the controller 174 to display a jump image capture notification on the second display unit 168 before capturing a jump image, and capture the jump image after the displaying of the jump image capture notification is ended.

Operations of the DSP 170 according to embodiments of the invention will now be described.

Figure 4:
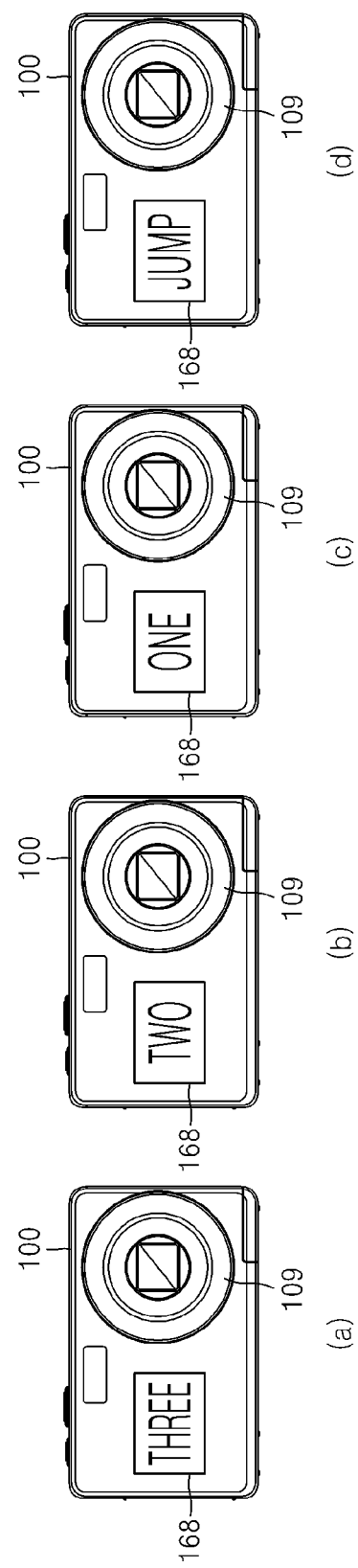
FIGS. 4 (*a*) through (*d*) are diagrams for describing the digital signal processor of FIG. 3 for notifying a subject about a jump, according to embodiments of the invention.
Figure 5:
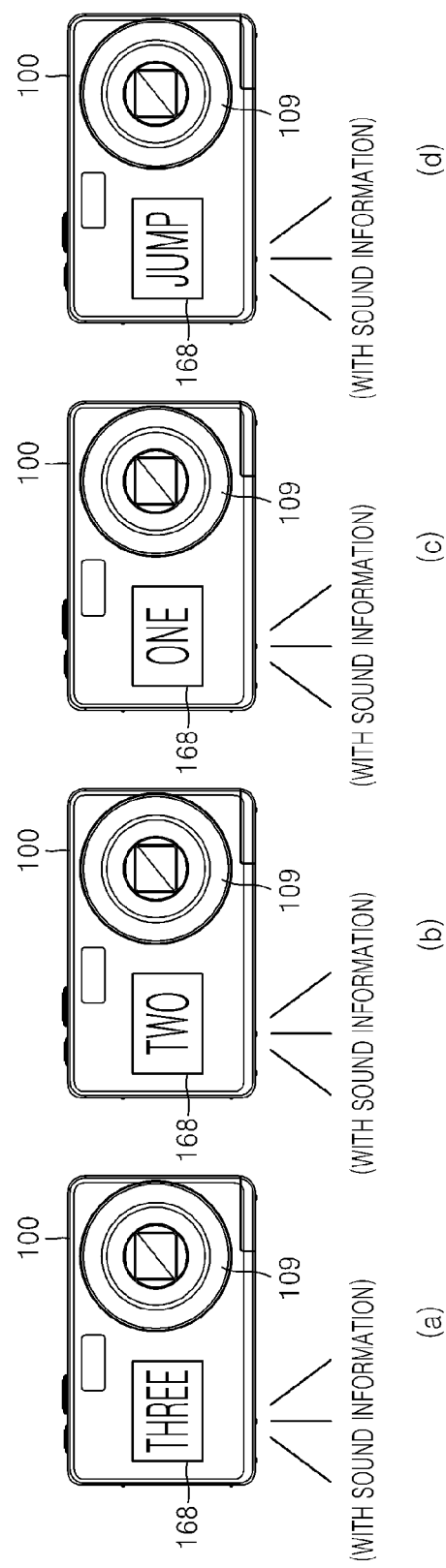
FIGS. 5 (*a*) through (*d*) are diagrams for describing the digital signal processor of FIG. 3 for notifying a subject to jump, according to embodiments of the invention.

The jump notification unit 171 provides a notification for the subject to jump to the second display unit 168 for viewing by a subject to be photographed jumping before capturing the image of the subject jumping. FIGS. 4 (*a*) through (*d*) illustrate a notification for the subject to jump according embodiments of the invention. As shown in FIG. 4, the jump notification unit 171 may provide countdown information, such as 3, 2, 1, jump, as the notification for the subject to jump to the second display unit 168. The subject may determine a point of time to jump by looking at the jump image capture notification displayed on the second display unit 168. FIGS. 5 (*a*) through (*d*) illustrate a notification for the subject to jump according to embodiments of the invention. FIG. 5 displays the jump image capture notification with sound information. The jump notification unit 171 may provide countdown information, for example, three, two, one, jump, as the jump image capture notification to the second display unit 168 with the sound information. The subject may determine a point of time to jump by looking at the notification for the subject to jump and hearing the sound information.

When the apparatus 100 is in a jump image capture mode, the setting change unit 172 may change the apparatus 100 to a shutter speed priority mode. The shutter speed priority mode may permit quickly capturing an image of a subject jumping without the image being blurry. Auto-focus, auto-exposure, and auto-white balance (3A) are performed according to the surroundings and the apparatus 100 is configured according to International Organization for Standardization (ISO) sensitivity while capturing the image of the subject jumping, and apparatus 100 is again configured at the moment when the image of the subject jumping is captured. For example, when the notification for the subject to jump is displayed in units of seconds, the ISO sensitivity is increased and the diaphragm 112 is opened if the surroundings are dark, to increase a shutter speed, thereby capturing an image when the subject is at the peak of the jump.

In embodiments, when a user, who determines that the subject jumped at the point of time to jump after the displaying of the notification for the subject to jump has ended, presses the shutter button, the controller 174 controls to capture the jump image. FIG. 6 illustrates a jump image captured as the user presses the shutter button, according to an embodiments of the invention.

An approximate time for the subject to jump and land after displaying the notification for the subject to jump image is about 1.331 seconds, and 0.665 seconds on average for the subject to reach to peak of the jump. Also, an approximate time for the subject to jump and land after hearing the sound information is about 1.038 seconds, and 0.520 seconds on average for the subject to reach the peak of the jump. Also, a shutter lag, i.e., a time difference between an actual time that the user pressed the shutter button and a time that the apparatus 100 recognizes that the shutter button is pressed, may be 62 ms. Accordingly, a time that the subject reaches the peak of the jump after the notification for the subject to jump has ended is about 0.665 seconds (for images) or 0.520 seconds (for sound), and thus the peak of the jump may be photographed by waiting about 600 ms after receiving an indication that the user of the apparatus has determined that the subject jumped after the notification for the subject to jump has ended.

The DSP 170 according to embodiments of the invention may include the jump notification unit 171, the setting change unit 172, the bracket unit 173, and the controller 174 to display a jump image capture notification on the second display unit 168 before capturing a jump image, and bracket the jump image after the displaying of the jump image capture notification is ended.

Operations of the DSP 170 according to embodiments of the invention will now be described.

Descriptions about the jump notification unit 171 and the setting change unit 172 will be omitted as they are similar to those according to the previous embodiments of the invention.

The bracket unit 173 is used to capture a plurality of jump images by pressing the shutter button once. Since it is important to capture the jump image according to a jump timing, the jump image when the subject is at the peak of the jump may be obtained by capturing the plurality of jump images by pressing the shutter button once. FIG. 7 illustrates jump images bracketed after displaying the jump image capture notification.

When the bracketing of the jump images is completed, the controller 174 may sequentially display the bracketed jump images on at least one of the first display unit 164 and the second display unit 168.

A method of capturing a jump image according to embodiments of the invention will now be described with reference to FIGS. 8 and 9. The method may be performed by the apparatus 100 of FIG. 2, and according to an embodiment, methods may be performed by the DSP 170 with the help of adjacent elements in the apparatus 100.

Figure 8:
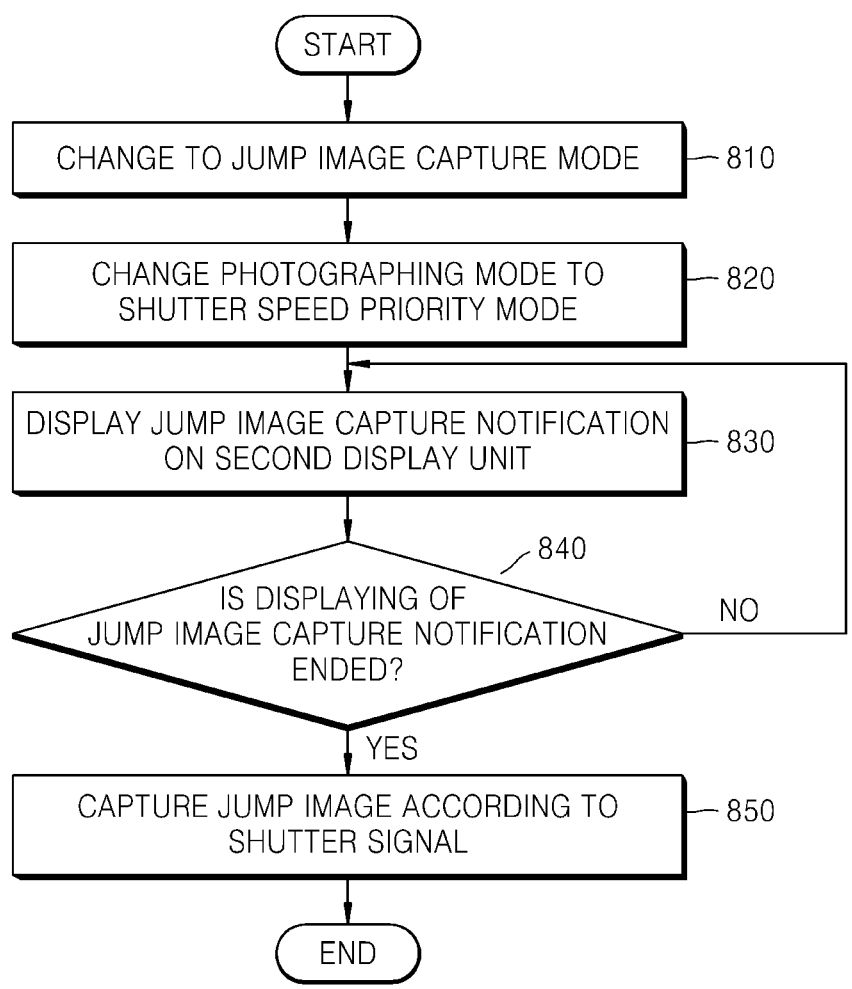
FIG. 8 is a flowchart illustrating a method of capturing an image of a subject jumping according to embodiments of the invention.

FIG. 8 is a flowchart illustrating the method according to embodiments of the invention.

When a user selects a jump image capture mode, the DSP 170 changes a photographing mode of the apparatus 100 to the jump image capture mode, in operation 810.

Then, the DSP 170 changes a setting of the apparatus 100 to a shutter speed priority mode, in operation 820. This is to quickly capture an image of a subject jumping. By changing the setting to the shutter speed priority mode, the degree of openness of the diaphragm 112 and an ISO sensitivity value also change.

Next, the DSP 170 provides a notification for the subject to jump to the second display unit 168. The DSP 170 provides countdown information, such as 3, 2, 1, jump, to the second display unit 168, with or without sound information. Then, the notification to the subject to jump is displayed on the second display unit 168, in operation 830. A subject to be photographed may determine a point of time to jump by looking at the notification for the subject to jump displayed on the second display unit 168.

The DSP 170 determines whether the displaying of the notification for the subject to jump has ended in operation 840, and when it is determined that the displaying of the jump image capture notification has ended, a jump image is captured in operation 850 by receiving a shutter signal received from a user when the subject jumps. In embodiments, the user does not have to press the shutter and the DSP 170 captures the image at an approximate time when the subject is at the peak of the jump.

FIG. 9 illustrates a method according to an embodiment of invention. The method begins with the DSP 170 changing a setting of the apparatus 100 to a shutter speed priority mode, in operation 920. This is to quickly capture a jumping moment. By changing the setting to the shutter speed priority mode, the degree of openness of the diaphragm 112 and an ISO sensitivity value also change.

Next, the DSP 170 provides a jump image capture notification to the second display unit 168. The DSP 170 provides countdown information, such as 3, 2, 1, jump, to the second display unit 168, with or without sound information. Then, the jump image capture notification is displayed on the second display unit 168, in operation 930. A subject to be photographed may determine a point of time to jump by looking at the notification for the subject to jump displayed on the second display unit 168.

The DSP 170 determines whether the displaying of the notification for the subject to jump has ended in operation 940, and when it is determined that the displaying of the notification for the subject to jump has ended, a jump image is captured in operation 950 by receiving a shutter signal received from a user when the subject jumps. In embodiments, the DSP 170 may capture the image without receiving a shutter signal from the user.

After operation 950, the DSP 170 may sequentially display the bracketed jump images on at least any one of the first display unit 164 and the second display unit 168, in operation 960.

According to embodiments of the invention, a jump image capture notification may be displayed after a face of a subject is detected by using a face recognition function of the apparatus 100.

According to embodiments of the invention, a jump image may be continuously captured. The bracketing and the continuous capturing are the same because a plurality of jump images are captured with one shutter signal, but in the bracketing, jump images are captured while changing the setting of the apparatus 100, such as an exposure value and an ISO sensitivity value. On the other hand, in the continuous capturing, at least one jump image is captured under the same setting with one shutter signal. Other operations of the continuous capturing are similar to the bracketing, and thus detailed descriptions thereof will not be repeated.

As such, according to the embodiments of the invention, a subject is notified about a point of time to jump before capturing a jump image, and a setting of an apparatus for capturing a jump image is changed to a shutter speed priority mode and then the jump image is bracketed. Accordingly, the jump image in which the subject is at the peak of the jump may be obtained.

The device described herein may include a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media, such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in methods that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are not confined to a specific order and can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An apparatus for capturing an image of a subject jumping, the apparatus comprising:
    a first display unit disposed on a rear of the apparatus;
    a second display unit disposed on a front of the apparatus; and
    a digital signal processor that, in response to a jump image capture mode selection indication,
        changes a photographing mode to a shutter speed priority mode prior to capturing the image,
        detects a face of the subject,
        displays a notification for the subject to jump, wherein the notification is displayed on the second display unit and is displayed when the face of the subject is detected, and
        automatically captures the image after a predetermined period of time after the display of the notification to jump has ended, wherein the predetermined period of time is based on a time for the subject to reach a peak of the jump.

2. The apparatus of claim 1, wherein the digital signal processor comprises: a jump notification unit configured to provide to the second display unit the notification for the subject to jump;
    a change unit configured to change the apparatus to the shutter speed priority mode; and a controller configured to capture the image in the shutter speed priority mode after displaying the notification for the subject to jump.

3. The apparatus of claim 2, wherein the jump notification unit is further configured to provide to the second display unit a series of countdown images as the notification instruction for the subject to jump, and configured to provide to the second display unit a series of countdown images with sound as the instruction to the subject to jump.

4. The apparatus of claim 1, wherein the digital signal processor is further configured to capture the image, if after the display of the notification to jump has ended, the digital signal processor receives an indication from a user of the apparatus that the subject has jumped.

5. The apparatus of claim 1, wherein the digital signal processor is further configured to continuously capture the image after displaying the notification for the subject to jump.

6. The apparatus of claim 1, wherein the digital signal processor is further configured to bracket the image after displaying of the notification for the subject to jump.

7. The apparatus of claim 6, wherein the digital signal processor is further configured to sequentially display results of bracketing the image on at least any one of the first display unit and the second display unit.

8. The apparatus of claim 6, wherein the digital signal processor further comprises: a bracket unit configured to bracket the image in the shutter speed priority mode after displaying of the notification for the subject to jump.

9. The apparatus of claim 1, wherein the predetermined period of time is an average period of time for the subject to reach the peak of the jump.

10. The apparatus of claim 9, wherein the average period of time is an average period of time for the subject to reach the peak of the jump after displaying the notification for the subject to jump.

11. The apparatus of claim 9, wherein the notification includes sound information;
    wherein the average period of time is an average period of time for the subject to reach the peak of the jump after the sound information.

12. A method of capturing an image of a subject jumping performed by an apparatus for processing digital images with a first and a second display, the method comprising:
    in response to a jump image capture mode selection indication, changing a photographing mode to a shutter speed priority mode prior to capturing the image;
    detecting a face of the subject;
    displaying a notification for the subject to jump, wherein the notification is displayed on the second display unit and is displayed when the face of the subject is detected; and
    automatically capturing the image after a predetermined period of time after the displaying of the notification has indicated that the subject should jump, wherein the predetermined period of time is based on a time for the subject to reach a peak of the jump.

13. The method of claim 12, wherein displaying a notification comprises:
    displaying a notification for the subject to jump on the second display unit comprising a series of countdown images.

14. The method of claim 13, wherein displaying further comprises:
    displaying a notification for the subject to jump on the second display unit comprising a series of countdown images with sound.

15. The method of claim 12, wherein capturing comprises:
    if a shutter signal from a user of the apparatus indicating that the subject jumped is received after the displaying of the notification has indicated that the subject should jump, then perform the following steps:
    delaying the predetermined period of time after the shutter signal is received; and capturing the image after delaying the predetermined period of time.

16. The method of claim 12, wherein capturing comprises: continuously capturing the image after the displaying of the notification has indicated that the subject should jump.

17. The method of claim 12, wherein capturing comprises: bracketing the image after the displaying of the notification has indicated that the subject should jump.

18. The method of claim 17, further comprising sequentially displaying results of the bracketing on at least one of the first display unit and the second display unit.

19. The apparatus of claim 1, wherein the notification for the subject to jump is a "JUMP" instruction displayed on the second display unit.

* * * * *